US012638813B2

(12) United States Patent
Lee et al.

(10) Patent No.: US 12,638,813 B2
(45) Date of Patent: May 26, 2026

(54) METHOD AND ENERGY HARVESTING SYSTEM FOR EXTRACTING MAXIMUM POWER FROM INPUT SOURCE

(71) Applicants: SKAIChips Co., Ltd., Suwon-si (KR); Research & Business Foundation SUNGKYUNKWAN UNIVERSITY, Suwon-si (KR)

(72) Inventors: Kang Yoon Lee, Seoul (KR); Ju Won Oh, Suwon-si (KR); Jong Wan Jo, Suwon-si (KR); Dong Gyun Kim, Suwon-si (KR)

(73) Assignees: SKAIChips Co., Ltd., Suwon-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 608 days.

(21) Appl. No.: 18/111,897

(22) Filed: Feb. 21, 2023

(65) Prior Publication Data

US 2024/0219870 A1      Jul. 4, 2024

(30) Foreign Application Priority Data

Dec. 29, 2022    (KR) ........................ 10-2022-0189774

(51) Int. Cl.
*G05B 13/02* (2006.01)
*H02J 3/00* (2026.01)
*H02J 101/24* (2026.01)
(52) U.S. Cl.
CPC ............ *G05B 13/0265* (2013.01); *H02J 3/00* (2013.01); *H02J 2101/25* (2026.01)
(58) Field of Classification Search
CPC . H02J 3/38; H02J 50/001; H02J 3/004; G05F 1/67; G01R 19/2513; G06N 20/00; G06Q 50/06; Y04S 10/123
See application file for complete search history.

(56) References Cited

U.S. PATENT DOCUMENTS

2009/0284240 A1    11/2009  Zhang et al.
2013/0285636 A1*   10/2013  Kung ........................ G05F 1/67
                                                     323/299
(Continued)

FOREIGN PATENT DOCUMENTS

CN           101236446 A      8/2008
KR     10-2011-0009233 A      1/2011
(Continued)

OTHER PUBLICATIONS

N. Femia, G. Petrone, G. Spagnuolo and M. Vitelli, "Optimizing sampling rate of P&O Mppt technique," 2004 IEEE 35th Annual Power Electronics Specialists Conference (Year: 2004).*
(Continued)

*Primary Examiner* — Mohammad Ali
*Assistant Examiner* — Dhruvkumar Patel

(57)                    ABSTRACT

Provided are a method and energy harvesting system for extracting maximum power from an input source. When the energy harvesting system includes a converter, a sensing part, an artificial intelligence (AI) calculator, and a resistor part, the method includes: sensing an input voltage and an input current from the input source using the sensing part, converting the input voltage and the input current corresponding to analog values into digital values through an analog-to-digital converter (ADC) block, and transmitting the digital values to the AI calculator; calculating input power on the basis of the digital values using the AI calculator and acquiring an optimal sampling ratio for extracting maximum power on the basis of the input power; controlling a resistor divider ratio on the basis of the optimal sampling ratio to equalize a sampling ratio to the optimal sampling ratio; and performing a regulation operation through the converter.

8 Claims, 7 Drawing Sheets

(56)                  References Cited

U.S. PATENT DOCUMENTS

| 2015/0048854 A1* | 2/2015 | Fornage | H02S 50/00 |
| | | | 324/713 |
| 2015/0123649 A1* | 5/2015 | Shao | H02S 50/00 |
| | | | 324/103 R |
| 2017/0117818 A1* | 4/2017 | Shao | H02J 50/001 |
| 2022/0163991 A1* | 5/2022 | Wu | H02J 3/381 |

FOREIGN PATENT DOCUMENTS

| KR | 10-1035705 | B1 | | 5/2011 | |
| KR | 101385692 | B1 | * | 4/2014 | G05F 1/67 |

OTHER PUBLICATIONS

A. Sangwongwanich and F. Blaabjerg, "Mitigation of Interharmonics in PV Systems With Maximum Power Point Tracking Modification," in IEEE Transactions on Power Electronics, vol. 34, No. 9, pp. 8279-8282, Sep. 2019 (Year: 2019).*

Shubham Negi et al., 'Adaptive Fractional Open Circuit Method for Maximum Power Point Tracking in a Photovoltaic Panel', 2019 32nd International Conference on VLSI Design and 2019 18th International Conference on Embedded Systems (VLSID), Jan. 5, 2019, 482-487 pages, IEEE. USA.

Dhwaj Raverkar et al., 'An Improved Fractional Voltage based MPPT technique for PV Generation System', 2020 International Conference on Advances in Computing, Communication & Materials (ICACCM) Aug. 21, 2020, 267-271 pages, IEEE. USA.

European Search Report dated Sep. 25, 2023 from European Patent Office for Application No. 23157509.3.

Office Action dated Oct. 10, 2023 from European Patent Office for Application No. 23157509.3.

Notice of Allowance mailed on Oct. 25, 2024 from Korean Patent Office for Application No. 10-2022-0189774.

* cited by examiner

| 16 bit | | | | |
|---|---|---|---|---|
| Ratio | Input Voltage | Input Curent | Output Voltage | Efficiency |
| 90% | | | 5V | 65% |
| 80% | | | 5V | 75% |
| 70% | | | 5V | 95% |

METHOD AND ENERGY HARVESTING SYSTEM FOR EXTRACTING MAXIMUM POWER FROM INPUT SOURCE

CROSS-REFERENCE TO RELATED APPLICATION(S)

This application claims priority from Korean Patent Application No. 10-2022-0189774, filed on Dec. 29, 2022, in the Korean Intellectual Property Office, the disclosure of which is incorporated herein by reference in its entirety.

BACKGROUND

1. Field

The following description relates to a method of tracking a maximum power point (MPP) in real time using an accelerated calculation function and an estimation function based on an artificial intelligence (AI) algorithm and an energy harvesting system using the same, and more specifically, to a method of extracting maximum power from an input source when an energy harvesting system for extracting the maximum power includes a converter, a sensing part, an AI calculator, and a resistor part, the method including sensing, by the energy harvesting system, an input voltage and an input current from the input source using the sensing part, converting the input voltage and the input current which correspond to analog values into digital values through an analog-to-digital converter (ADC) block, and transmitting the digital values to the AI calculator; calculating, by the energy harvesting system, input power on the basis of the digital values using the AI calculator and acquiring an optimal sampling ratio for extracting maximum power on the basis of the input power; controlling, by the energy harvesting system, a resistor divider ratio on the basis of the optimal sampling ratio to equalize a sampling ratio to the optimal sampling ratio; and after a sampling operation based on the optimal sampling ratio is completed, performing, by the energy harvesting system, a regulation operation through the converter.

2. Description of Related Art

Modern society is promoting the development of technologies related to reducing carbon usage and increasing the utilization of renewable energy according to the declaration of carbon neutrality. Among renewable energies, photovoltaic energy is energy that is transmitted and received as electric power in the process of receiving light energy from the sun through a solar panel and converting the light energy into a direct current (DC) or alternating current (AC) voltage and is also the most usable power from a consumer's point of view. Other harvesting sources include triboelectric and radio frequency (RF)-DC energy sources, and thus Internet of things (IoT)-based systems are designed for various purposes on the basis of multiple energy sources.

As a technology for utilizing as much input power as possible, maximum power point tracking (MPPT) technology has been being introduced. When tracking maximum power is possible through the corresponding technology, more power can be drawn from the energy harvesting source and transferred during the same time.

FIG. 1 is a set of graphs illustrating the relationship between an open circuit voltage and transfer power according to the related art.

A result of deriving the relationship between an open circuit voltage and transfer power in connection with the related art represents that the maximum power can be extracted at 80% of most open circuit voltages as shown in FIG. 1A, and an algorithm can be designed on the basis of the result to build a system.

However, as a result of showing the relationship between power received from a harvesting source and an output voltage in real life and deducing again efficiency of transfer power with respect to 80% of an open circuit voltage in each situation (e.g., a voltage and a current that can be received while the sun is up or down), it is possible to see that MPPs are not obtained at 80% of the open circuit voltage but different MPPT ratios are obtained (see FIG. 1B).

Accordingly, when an MPPT algorithm is designed for 80% of an open circuit voltage and a converter performs regulation according to the related art, it is not possible to extract maximum power, which is inefficient. Also, this does not suit the fundamental goal of building a highly efficient power transfer system for an energy harvesting source.

Existing perturbation and observation (P&O) algorithms involve sensing an input voltage and current received from an energy harvesting source and comparing the power with past power to track an MPP. However, there is a risk of inefficiency in tracking with a quantization error and an algorithm's misjudgment of a minimum power point as an MPP.

To solve these problems, the present applicant proposes a method of tracking an MPP in real time using an accelerated calculation function and an estimation function based on an artificial intelligence (AI) algorithm and an energy harvesting system using the same.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description does not relate to simply setting a fixed voltage ratio (e.g., 80%) but relates to increasing accuracy in maximum power point (MPP) tracking and maximizing efficiency by estimating an MPP of 50% to 90% through a maximum power point tracking (MPPT) technique based on an artificial intelligence (AI) algorithm and performing sampling accordingly.

The following description also relates to minimizing inefficiency in the power generation of an energy harvesting source by estimating and applying an MPPT ratio (voltage and the like) through an AI model which is trained on the basis of data of previously measured input power and output power, and building an energy-harvesting-based power generation system on the basis of minimized inefficiency.

Technical objects to be achieved in the present invention are not limited to those described above, and other technical objects that have not been described will be clearly understood by those of ordinary skill in the art from the following description.

In one general aspect, a method of extracting maximum power from an input source when an energy harvesting system for extracting the maximum power includes a converter, a sensing part, an AI calculator, and a resistor part includes: sensing, by the energy harvesting system, an input voltage and an input current from the input source using the sensing part, converting the input voltage and the input current which correspond to analog values into digital values through an analog-to-digital converter (ADC) block, and transmitting the digital values to the AI calculator; calculating, by the energy harvesting system, input power on the basis of the digital values using the AI calculator and acquiring an optimal sampling ratio for extracting maximum power on the basis of the input power; controlling, by the energy harvesting system, a resistor divider ratio on the basis of the optimal sampling ratio to equalize a sampling ratio to the optimal sampling ratio; and after a sampling operation based on the optimal sampling ratio is completed, performing, by the energy harvesting system, a regulation operation through the converter.

In another general aspect, an energy harvesting system that is a system for extracting maximum power from an input source includes: a sensing part configured to sense an input voltage and an input current from the input source, convert the input voltage and the input current which correspond to analog values into digital values through an ADC block, and transmit the digital values to an AI calculator; the AI calculator configured to calculate input power on the basis of the digital values and acquire an optimal sampling ratio for extracting maximum power on the basis of the input power; a converter configured to perform a regulation operation after a sampling operation based on the optimal sampling ratio is completed, and a resistor. A resistor divider ratio is controlled on the basis of the optimal sampling ratio to equalize a sampling ratio to the optimal sampling ratio.

Other features and aspects will be apparent from the following detailed description, the drawings, and the claims.

Figure 1A:
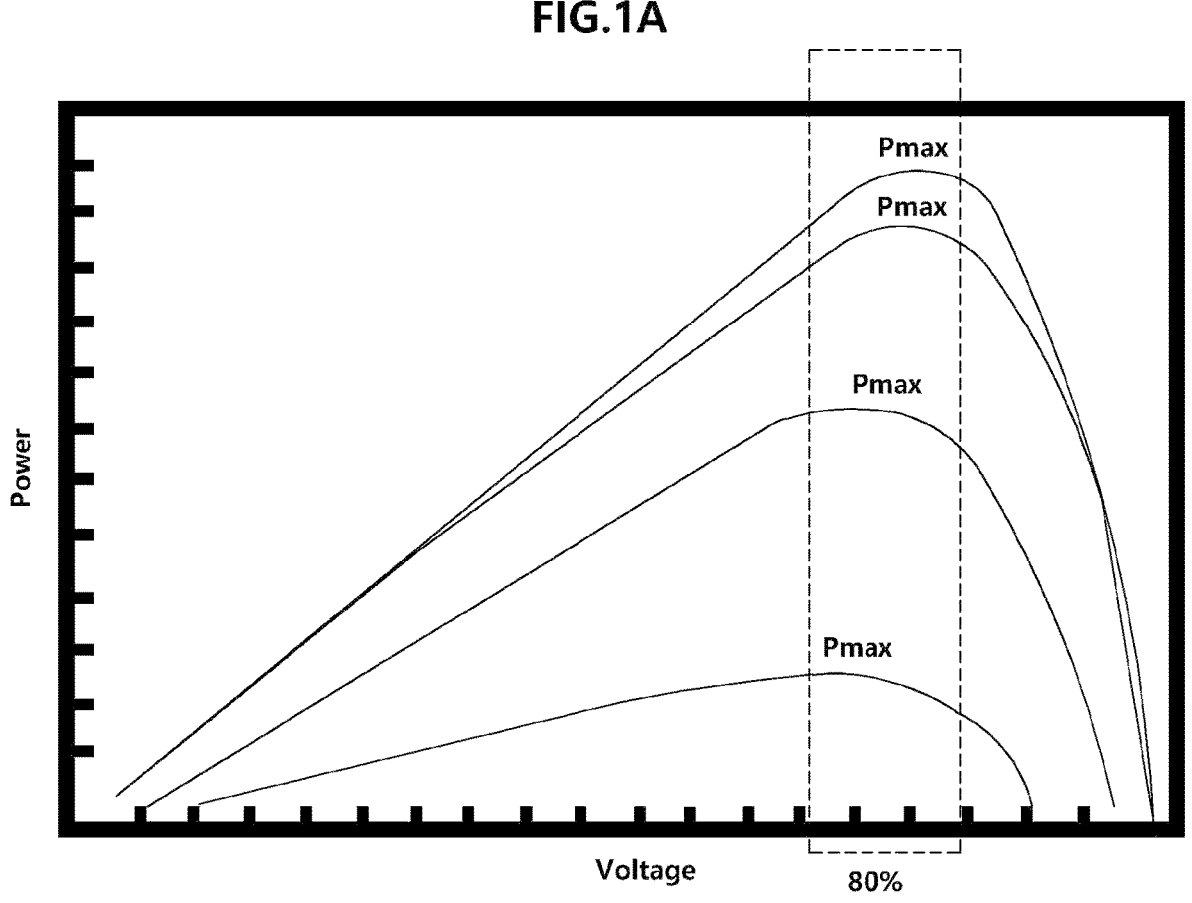
FIGS. 1A and 1B are a set of graphs illustrating the relationship between an open circuit voltage and transfer power according to the related art.
Figure 1B:
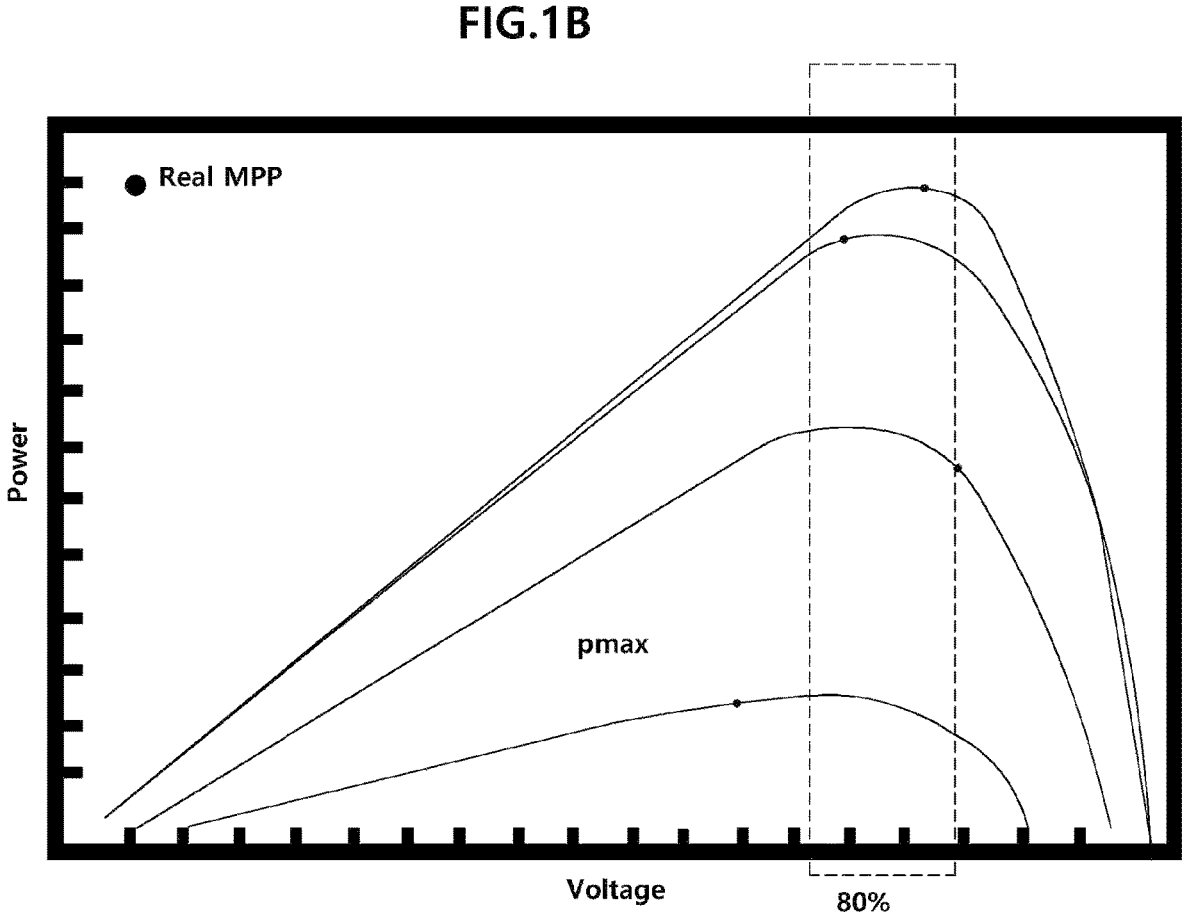

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description of the present invention refers to the accompanying drawings that show, as examples, specific embodiments in which the present invention may be implemented. These embodiments are described in sufficient detail to enable those of ordinary skill in the art to implement the present invention. It should be understood that various embodiments of the present invention are different but are not mutually exclusive. For example, certain shapes, structures, and characteristics described herein may be implemented in other embodiments without departing from the spirit and scope of the present invention in connection with an embodiment. It should also be understood that the positions or arrangement of individual elements in each disclosed embodiment may be varied without departing from the spirit and scope of the present invention. Therefore, the following detailed description is not to be taken in a limiting sense, and the scope of the present invention is limited only by the appended claims along with the full scope of equivalents to which the claims are entitled when properly explained. In the drawings, like reference numerals refer to the same or similar functions throughout several aspects.

Hereinafter, exemplary embodiment of the present invention will be described in detail with reference to the accompanying drawings so that those of ordinary skill in the art can easily implement the present invention.

The present invention relates to a technology for transferring maximum power in a process of producing power through an input source, such as an energy harvesting source and the like, and a direct current (DC)-DC converter and transferring the power to a target system, that is, a technology for estimating and tracking a maximum power point (MPP) through artificial intelligence (AI).

The technology proposed by the present invention is obtained by expanding a sampling technique of saving an MPP voltage as a reference voltage, that is, a fundamental method of an existing MPPT technology employing a DC-DC converter. According to the technology proposed by the present invention, an AI part calculates and estimates maximum power appropriate for input power and output power in accordance with a sampling ratio of 50% to 90% for dividing an input open circuit voltage (input voltage) at regular intervals rather than a fixed ratio (e.g., 80%) and then orders an appropriate ratio for the converter so that the converter performs as much regulation as the ratio.

To implement the technology, it is necessary to know the amounts of input and output currents in accordance with a ratio of 50% to 90% between a single input open circuit voltage and a corresponding output voltage under a specific situation, calculate efficiency on the basis of the amounts of input and output currents, and datafy the calculation results as efficiency information of all cases within the entire range of voltage that may be input to and output from a converter.

First, it may be necessary to datafy the efficiency of an input-output relationship in the form of a table. Specifically, a technology may be required for sensing an input voltage and current on the basis of a design method for setting a resistor divider ratio for changing a sampling ratio to 50% to 90% at intervals of 10% by deviating from an existing converter design method according to the related art. Also, previous data of an output voltage and current may be necessary for feedback regarding results of changing an MPPT sampling ratio.

Further, resistor dividing trim, input and output voltages, and current sensing may be required. An AI algorithm may be required to infer the amount of power currently received by an input source and input and output voltages by calculating efficiency with respect to the maximum power on the basis of efficiency which is in the form of a big data table.

Finally, MPPT algorithm-based power efficiency calculation AI may be required. Specifically, the corresponding technology (calculation by AI) may be required for implementing, through a model for predicting a next state on the basis of a recurrent neural network (RNN), a method of determining whether an MPP deviates by a certain ratio when a ratio of a most recently sampled input voltage is maintained, by estimating a future power value on the basis of past and current power values obtained through sensing data of input power and stopping a converter operation in an appropriate situation to update a sampling ratio and a voltage.

As a result, a dividing sampling ratio of an open circuit voltage is determined by sensing an input voltage and current and an output voltage on the basis of efficiency of various cases (the data table) measured in advance through the converter and checking a regulation voltage for maximum efficiency, and the dividing sampling ratio is adjusted through resistor trimming. As a system operation sequence for this, according to operations of the DC-DC converter, an MPPT sampling operation may be performed in a certain period, a corresponding calculation may be performed by an AI calculator in an initial sampling period to find a ratio, a resistor divider ratio may be adjusted on the basis of the ratio, sampling may be completed, and then regulation may be performed by the converter with a completion signal. This may be repeated.

This will be described in detail below together with a configuration.

Figure 2:
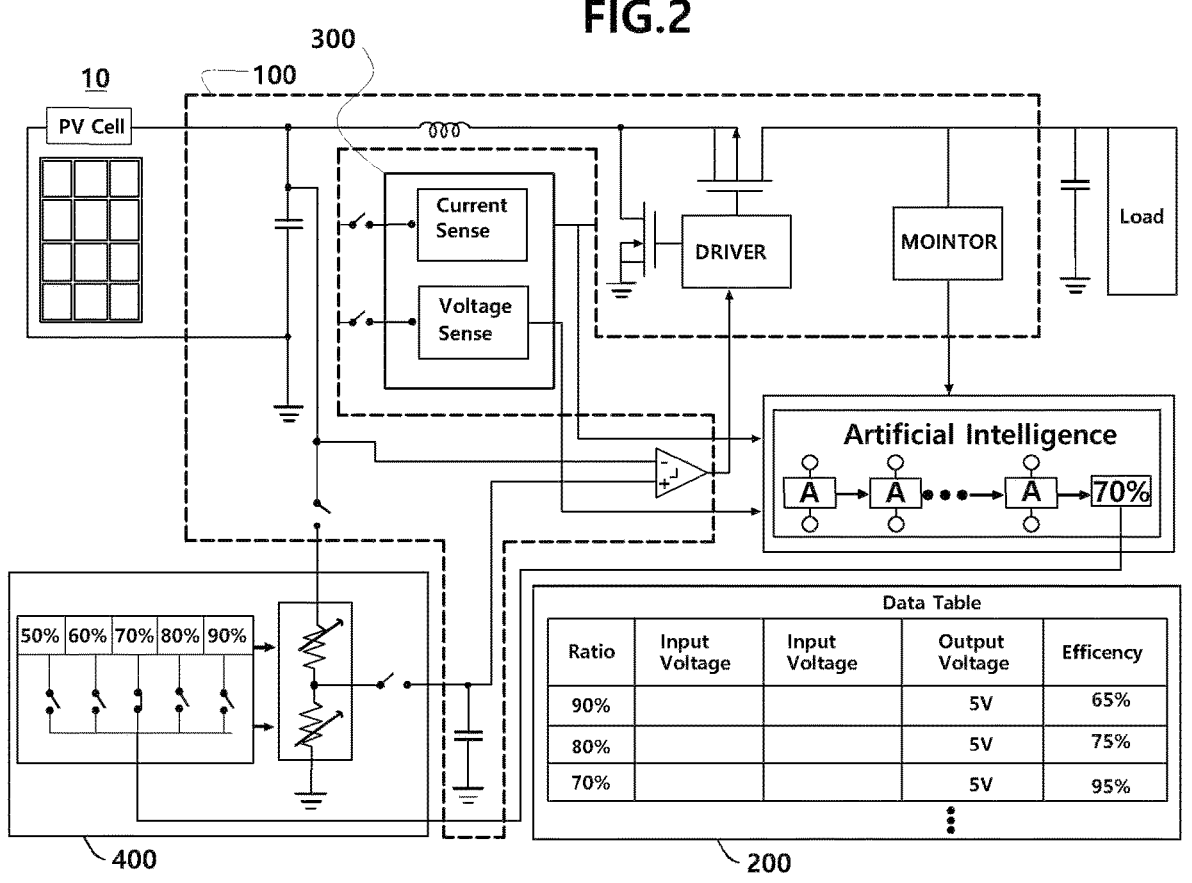
FIG. 2 is a diagram showing a configuration of an energy harvesting system according to an exemplary embodiment of the present invention.

FIG. 2 is a diagram showing a configuration of an energy harvesting system according to an exemplary embodiment of the present invention.

FIG. 2 is a conceptual diagram of an energy harvesting system 10 that is combined with a converter 100 and an AI calculator 200 for changing an MPPT voltage sampling ratio and extracts maximum power from an input source (e.g., a solar panel and the like).

The energy harvesting system 10 may include a power conversion part (converter) 100, which is the core of the energy harvesting system 10, including input and output capacitors, an inductor, a power metal-oxide-semiconductor field-effect transistor (MOSFET) (with a driver), and an MPPT, an AI calculator 200 including AI and a data table which are the core technology of the present invention, a sensing part 300 for receiving data (current and voltage) to calculate input power, and finally a resistor 400 for adjusting a sampling ratio in accordance with a value determined by the AI calculator 200.

The energy harvesting system 10 may include a sensing block obtained by adding a circuit path for sensing an input voltage and current to the basic power converter 100, that is, a DC-DC converter.

The sensing block is the sensing part 300 which is a block for collecting basic data for calculating power and used as a collection partner for converting an analog signal into a digital signal to be calculated by the AI calculator 200.

The energy harvesting system 10 may additionally include a data conversion part based on an analog-to-digital converter (ADC) for converting an analog signal into a digital signal. The corresponding part is used as a part for converting an analog signal into a digital signal (information) so that the AI calculator 200 calculates power and an optimal power point as described above.

The core technology of the present invention for calculating an MPP corresponds to the AI calculator 200. An AI block of a digital domain for calculating a large amount of data is added to the AI calculator 200, and the AI calculator 200 is in charge of controlling trimming of the resistor 400 by determining an MPPT sampling ratio in accordance with a calculation algorithm sequence disclosed herein. Also, a process of skipping an MPPT sampling process or modifying an MPPT sampling ratio through the calculation of estimating next power on the basis of past input power and current input power is added to deviate from existing algorithms for sampling an MPPT voltage during a certain period, determine a sampling time and control the converter 100 in real time through the AI.

Finally, the resistor 400 is in charge of a sampling ratio of an MPPT voltage. The corresponding circuit is designed on a board and is a part in which a switch of the resistor 400 operates due to a signal applied in accordance with the sampling ratio determined by the AI calculator 200 to sample an MPPT voltage in accordance with the basic voltage divider rule. The resistor 400 may be used as a part for generating a target of tracking.

The technology of the present invention can be applied to various systems ranging from a battery charging system based on a system which transfers power through various input sources, such as an energy harvesting source and the like, to a home generator.

Figure 3:
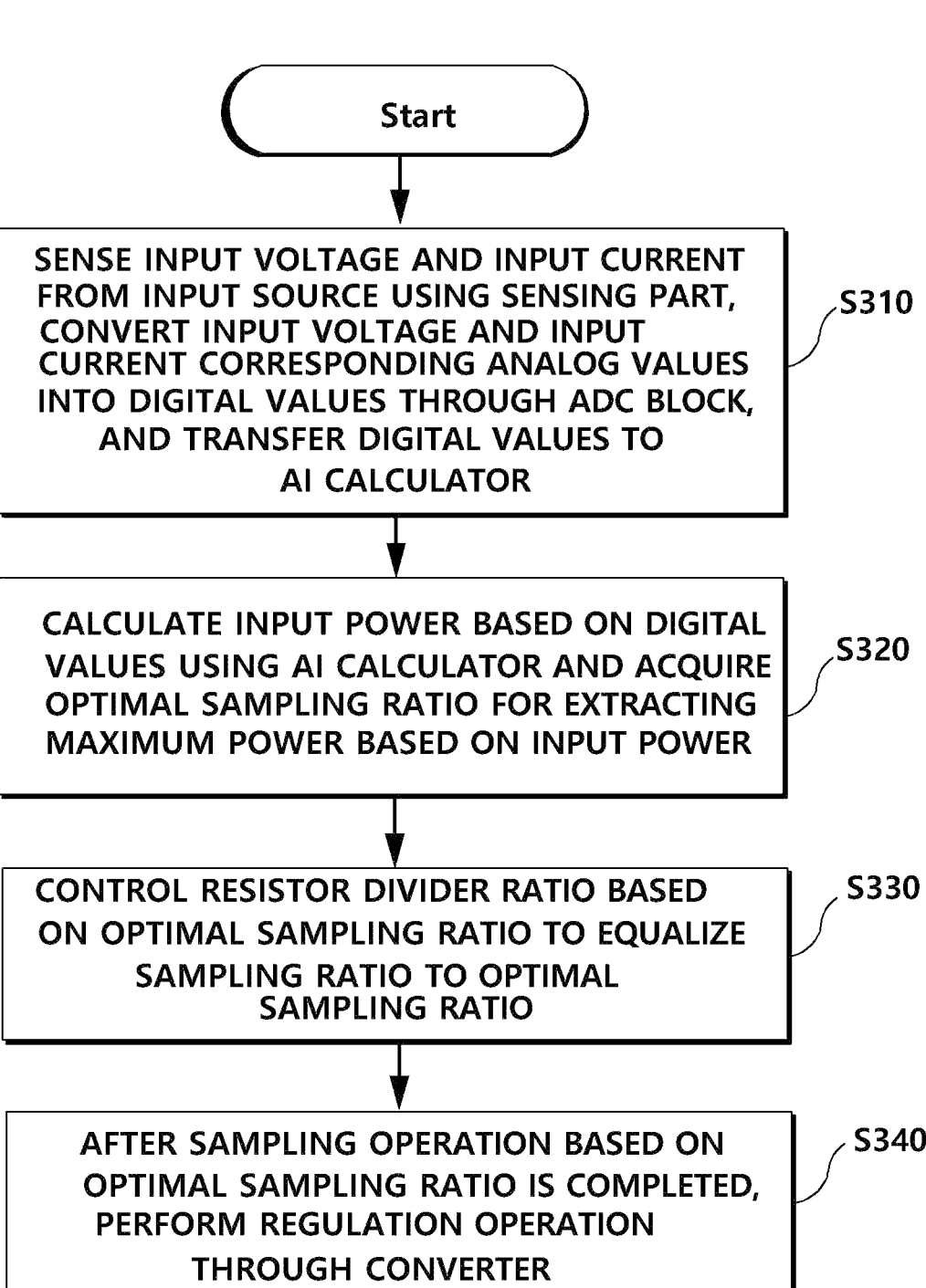
FIG. 3 is a flowchart illustrating a process until a regulation operation is performed according to an exemplary embodiment of the present invention.

FIG. 3 is a flowchart illustrating a process until a regulation operation is performed according to an exemplary embodiment of the present invention.

First, the energy harvesting system 10 may sense an input voltage and an input current from an input source (a solar panel and the like) using the sensing part 300. Specifically, when the converter 100 of the energy harvesting system 10 starts operating, a switch of the sensing part 300 may be turned on to sense the input voltage and the input current. Also, the switch of the sensing part 300 may be turned on to sense the input voltage through an output voltage monitoring circuit in the converter 100, which will be described below.

For reference, a sensing circuit corresponding to the sensing part 300 of the present invention can adjust a sensing range in accordance with a desired input range which is appropriate for an ADC circuit receiving a sensing output and can sense the input voltage and the input current within a range allowed by the area with low power. Therefore, the sensing circuit can be advantageously applied to energy harvesting.

Also, the energy harvesting system 10 may convert the input voltage and the input current corresponding to analog values into digital values through an ADC block and transfer the digital values to the AI calculator 200 (S310).

Subsequently, the energy harvesting system 10 may calculate input power on the basis of the digital values using the AI calculator 200 and acquire an optimal sampling ratio for extracting maximum power on the basis of the input power (S320). Here, the input power may be acquired by multiplying the input voltage and the input current.

Also, the energy harvesting system 10 may control a resistor divider ratio on the basis of the optimal sampling ratio to equalize a sampling ratio to the optimal ratio (S330). Specifically, the energy harvesting system 10 may turn off the switch of the sensing part 300 and control a resistor divider value of the resistor 400 on the basis of the optimal sampling ratio for tracking the maximum power, thereby equalizing a sampling ratio to the optimal ratio.

The process of acquiring the optimal sampling ratio may be considered a sampling operation. This will be described in further detail below with reference to FIG. 4 and the like.

Figure 4:
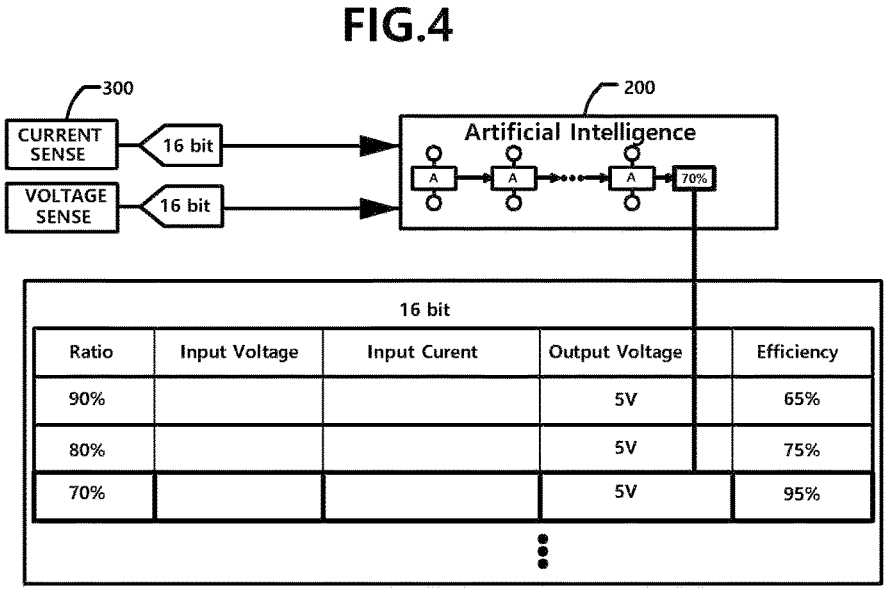
FIG. 4 is a data table used by an artificial intelligence (AI) calculator according to an exemplary embodiment of the present invention.

FIG. 4 is a data table used by an AI calculator according to an exemplary embodiment of the present invention.

FIG. 4 may correspond to a conceptual diagram of AI technology for an AI calculator to calculate an input voltage, an input current, an output voltage, and efficiency using bit compression technology. Here, it is possible to collect input power and controlled sampling ratio information by storing and compressing information on the voltage and the current into 16 bits and storing and compressing information on the efficiency into 3 bits and increase system energy efficiency by processing the input power and controlled sampling ratio information through AI.

In particular, the AI calculator 200 may use a data table, in which an input voltage for a table and an output voltage for a table and efficiency in accordance with an input current for a table may be recorded for each of a plurality of sampling ratios.

Although only 90%, 80%, and 70% are shown as a plurality of sampling ratios in FIG. 4, 10%-interval sampling ratios, such as 50%, 60%, 70%, 80%, 90%, etc., may be included. The intervals of 10% are merely exemplary and in some cases, may be further subdivided for the sake of performance or a user's convenience.

An input voltage for a table, an input current for a table, an output voltage for a table, and efficiency may be recorded for each of the plurality of sampling ratios.

Information recorded in the data table may correspond to data that is measured and learned in advance to calculate efficiency, that is, how much power is output from input power (an input voltage for a table and an input current for a table) through the converter 100 of the energy harvesting system 10, in various cases (a plurality of sampling ratios). The output power may be determined on the basis of an output voltage for a table and the like. The data table may correspond to a table stored in a memory and the like as a medium for determining an MPP.

Specifically, the input voltage for a table corresponds to an input voltage (open circuit voltage) sensed in advance by the sensing part 300, and the input current for a table may correspond to an input current sensed in advance by the sensing part 300. Also, the output voltage for a table may correspond to an output voltage determined through the output voltage monitoring circuit in the converter 100 (may not be determined through the output voltage monitoring circuit but may correspond to a fixed value (e.g., 6 V) in some cases).

A process of measuring an output voltage through the output voltage monitoring circuit will be described below with reference to FIG. 5.

Figure 5:
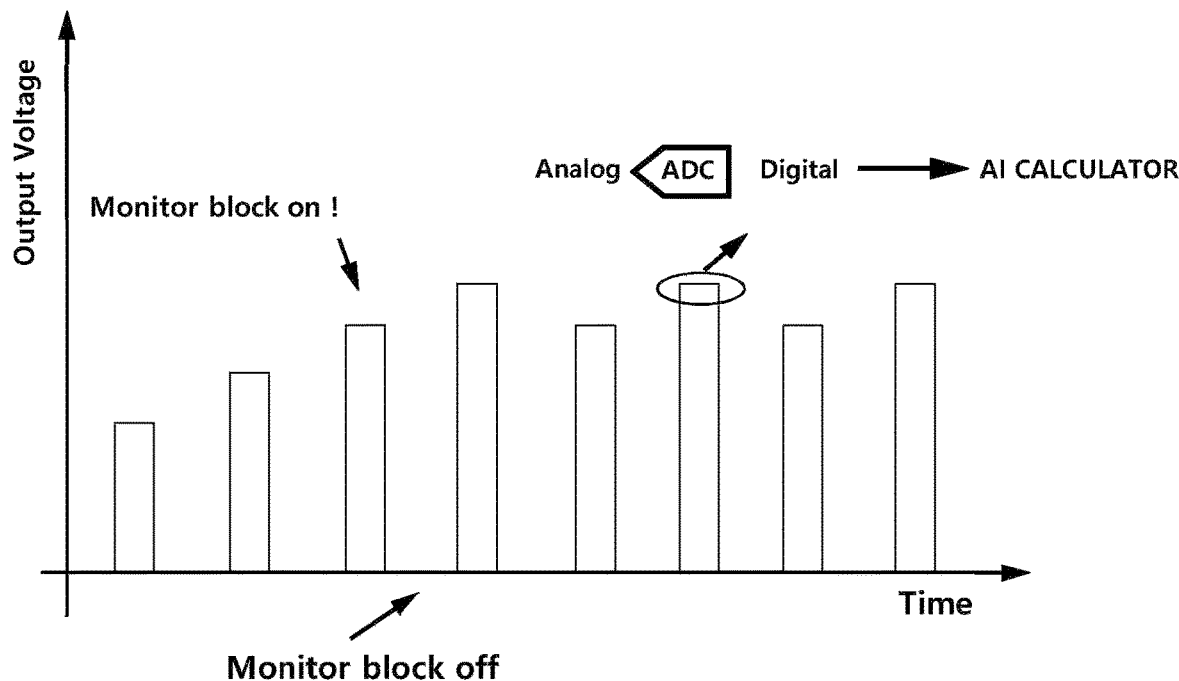
FIG. 5 is a graph showing an output voltage measured by an output voltage monitoring circuit according to an exemplary embodiment of the present invention.

FIG. 5 is a graph showing an output voltage measured by an output voltage monitoring circuit according to an exemplary embodiment of the present invention.

The energy harvesting system 10 may acquire an output voltage corresponding to an analog value every certain cycle using the output voltage monitoring circuit included in the converter 100, convert the output voltage into a digital value through the ADC block, and transfer the digital value to the AI calculator 200.

Specifically, the energy harvesting system 10 may determine an output voltage level by turning on the output voltage monitoring circuit for a certain cycle, connect a battery to the converter 100 in accordance with the voltage level, and consequently determine an output voltage of the converter 100.

Also, since an output voltage level is obtained when the output voltage monitoring circuit is turned on, a corresponding voltage value may be converted into a digital value through a bundle of the ADC block and the output voltage monitoring circuit at the turning-on timing, and information on the output voltage may be transferred to the AI calculator 200.

Further, when the output voltage monitoring circuit is turned on, the switch of the sensing part 300 may also be turned on. Accordingly, an input voltage, an input current, and an output voltage may be sensed at the same time and converted into digital values through the ADC block. In other words, the energy harvesting system 10 may acquire an input voltage and an input current corresponding to analog values every certain cycle using the sensing part 300, convert the input voltage and the input current into digital values through the ADC block, and transfer the digital values to the AI calculator 200.

As a result, the energy harvesting system 10 can acquire an input power (input current×input voltage) through the sensing part 300 and acquire an output voltage through the output voltage monitoring circuit.

Also, among a plurality of sampling ratios included in the data table, the energy harvesting system 10 can acquire the most efficient optimal sampling ratio on the basis of the input power calculated using the AI calculator 200 and the output voltage determined through the output voltage monitoring circuit.

Figure 6:
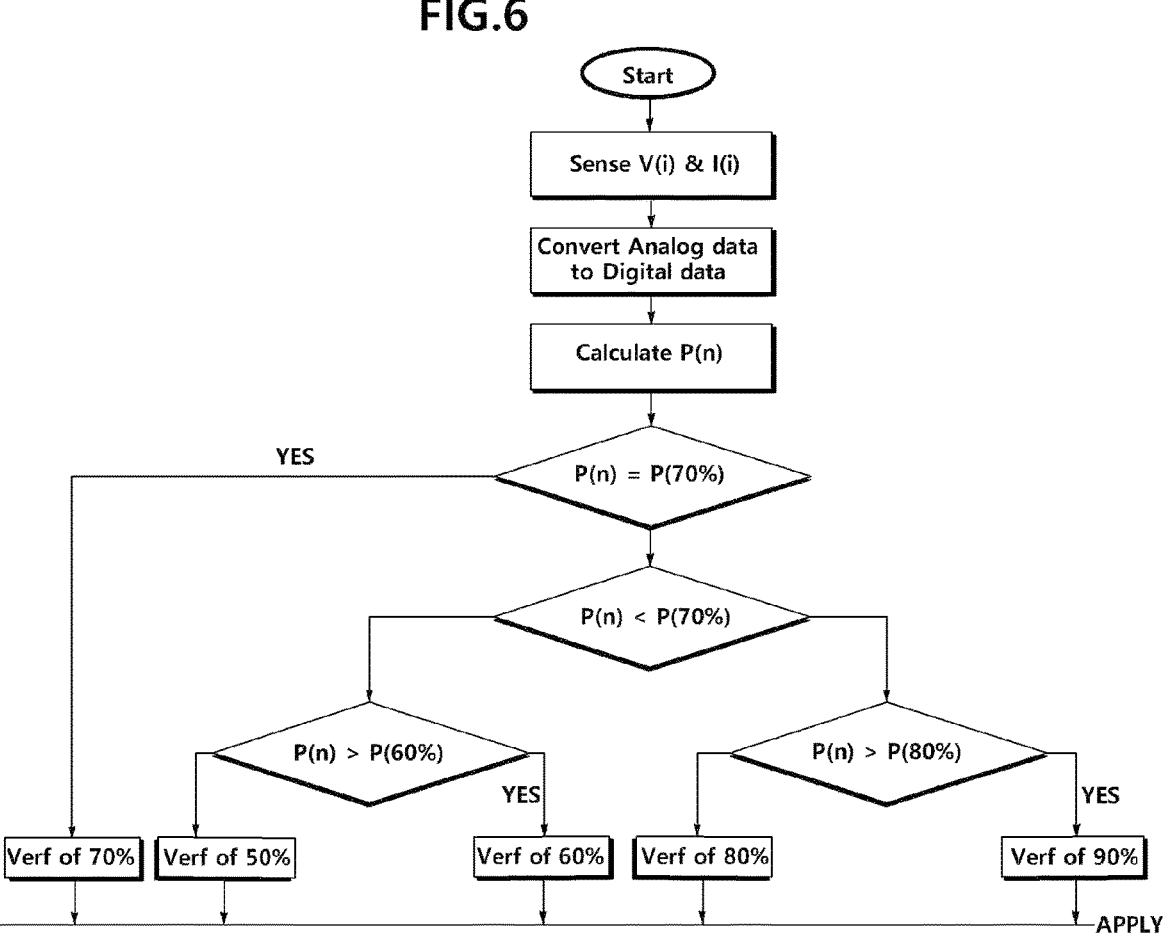
FIG. 6 is a flowchart illustrating a process of acquiring an optimal sampling ratio according to an exemplary embodiment of the present invention.

FIG. 6 is a flowchart illustrating a process of acquiring an optimal sampling ratio according to an exemplary embodiment of the present invention.

When MPPT sampling (including a process of acquiring the most efficient optimal sampling ratio) is started, an input voltage and an input voltage may be sensed by the sensing part 300, and the corresponding analog values may be converted into digital values. Subsequently, the AI calculator 200 may calculate input power on the basis of the digital values.

Also, among a plurality of sampling ratios (e.g., 70%, 80%, and 90%) recorded in the data table which is a set of already measured information, the energy harvesting system 10 may acquire an optimal sampling ratio (e.g., 70%) which corresponds to the same input power and the same output voltage (determined through the output voltage monitoring circuit) and has the highest efficiency (e.g., 95%) through the AI calculator 200.

In other words, the energy harvesting system 10 may acquire an MPP voltage that corresponds to the optimal sampling ratio (e.g., 70%)×the input voltage and outputs the highest power.

The process of finding an optimal sampling ratio will be described in further detail with reference to FIG. 6.

In general, power corresponding to a median (70% in FIG. 6) of a plurality of sampling ratios (e.g., 50%, 60%, 70%, 80%, and 90%) taken into consideration may be compared with the input power (input current×input voltage) first. When the power is identical to the input power, the optimal sampling ratio may be set to 70%. In other words, it may be determined first whether the input power is in the same range as (identical to) the power corresponding to the median ratio (70%).

In the drawing, the median ratio corresponds to an optimal sampling ratio and thus is compared first. However, unlike what is shown in FIG. 6, a ratio other the median ratio may be compared first.

Also, when the power corresponding to the median ratio (70%) is not identical to the input power, the energy harvesting system 10 may compare the power corresponding to the median ratio (70%) with the input power and then perform the following process.

When the power corresponding to the median ratio (70%) is greater than the input power, the energy harvesting system 10 may compare power (80%) corresponding to a ratio larger than the median ratio with the input power. When the input power is greater than the power, the energy harvesting system 10 may set the optimal sampling ratio to 90%, and when the input power is less than the power, the energy harvesting system 10 may set the optimal sampling ratio to 80%.

On the other hand, when the power corresponding to the median ratio (70%) is less than the input power, the energy harvesting system 10 may compare power (60%) corresponding to a ratio smaller than the median ratio with the input power. When the input power is greater than the power, the energy harvesting system 10 may set the optimal sampling ratio to 60%, and when the input power is less than the power, the energy harvesting system 10 may set the optimal sampling ratio to 50%.

Subsequently, the energy harvesting system 10 may control a resistor divider ratio of the resistor 400 for the optimal sampling ratio (e.g., 70%). In other words, the energy harvesting system 10 may change a value corresponding to resistor trimming through an output of the AI calculator 200 and then perform a sampling operation on the basis of the MPP voltage.

After the sampling operation based on the optimal sampling ratio is completed, the energy harvesting system 10 may perform a regulation operation on the basis of the MPP voltage through the converter 100 (S340).

To perform an operation for the MPPT sampling, the energy harvesting system 10 may turn on a switch of a resistance path to store the optimal sampling ratio (70%) in the capacitors, turn off the switch, and then perform the regulation operation of the converter 100.

As a result, the energy harvesting system 10 may repeatedly perform the sampling operation (VIN sampling period) of acquiring the optimal sampling ratio (70%) having the highest efficiency on the basis of the output voltage and the regulation operation based on a sampled voltage.

In particular, while the sampling operation is repeatedly performed, the process of finding an optimal sampling ratio on the basis of AI is repeatedly performed. Accordingly, the energy harvesting system 10 is advantageous in dealing with changing circumstances, and efficiency can be improved.

Meanwhile, according to the present invention, the sampling operation may be skipped to increase efficiency. This will be described below with reference to FIGS. 7 and 8.

Figure 7:
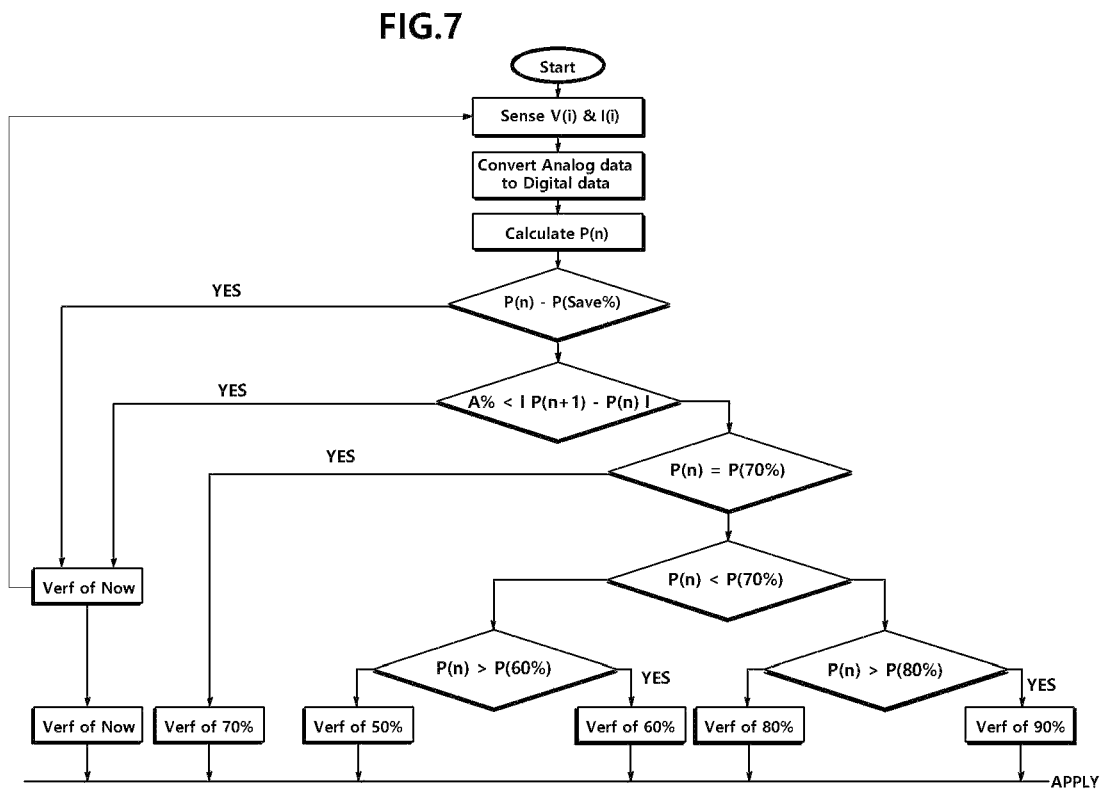
FIG. 7 is a flowchart illustrating a process of determining whether to skip a sampling operation according to an exemplary embodiment of the present invention.

FIG. 7 is a flowchart illustrating a process of determining whether to skip a sampling operation according to an exemplary embodiment of the present invention.

FIG. 7 is a flowchart of overall system operations to which a corresponding algorithm is applied. The sensing part 300 for sensing an input voltage and current is repeatedly turned on for a very short time during a certain period of time to convert information on the voltage and current values through the ADC block, and then the AI calculator 200 may continuously perform the calculation of a sampling ratio.

Subsequently, when a sampling ratio gradually deviates from that for a current tracking voltage as a result of a moment at which a current sampling ratio is not identical to an optimal sampling ratio (e.g., when a sampling ratio for a current tracking voltage is 80%, power calculated on the basis of input power sensing is not 80% but is 70% or 90%, and the result value gradually deviates from 80%), regulation may be stopped, and a process of storing a sampling voltage for a ratio calculated by the AI calculator 200 may be performed. After that, the operation of the converter 100 may be performed again.

As the core process of FIG. 7, the AI calculator 200 estimates P(n+1) on the basis of P(n) and P(n−1), and when a sampling ratio for the power deviates from that for a current tracking voltage (when a sampling ratio for a current tracking voltage is 80% but an optimal sampling ratio determined by the AI calculator 200 is 70% or 90%), the operation of the converter 100 may be stopped, and then the accuracy of MPPT may be increased in real time through an operation of modifying the sampling ratio again.

Also, when a current sampling voltage ratio is determined to be appropriate, the sampling process may be skipped, and tracking may continue. Accordingly, it is possible to track an MPP in real time and reduce unnecessary waste of energy (input power wasted in a sampling process).

This will be described in further detail with reference to FIG. 8.

Figure 8:
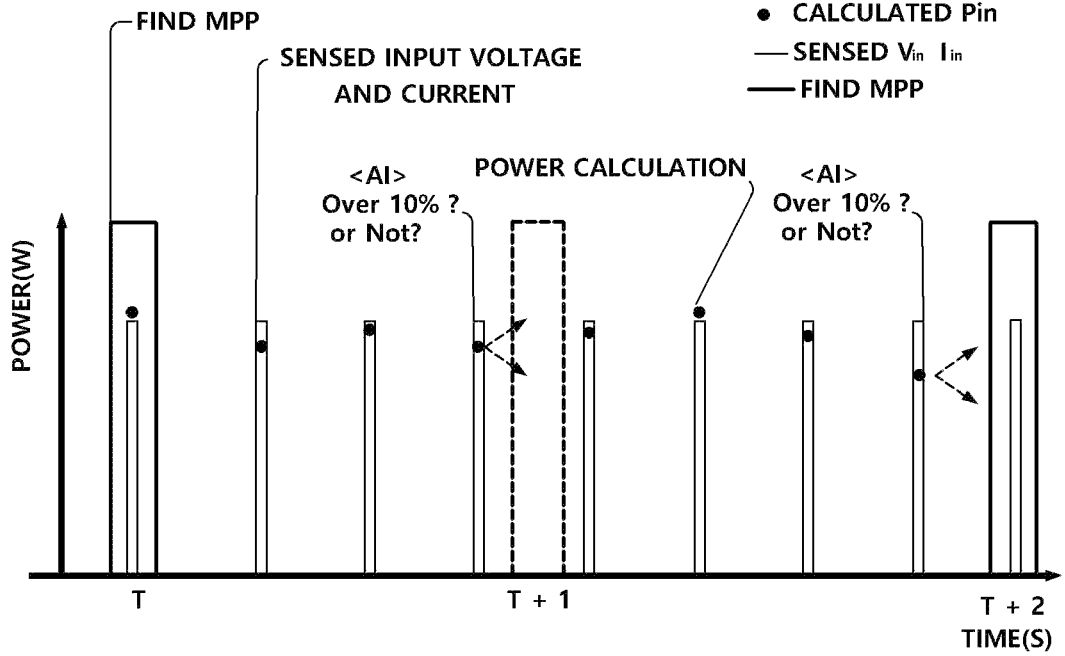
FIG. 8 is a graph showing whether to skip a sampling operation according to an exemplary embodiment of the present invention.

FIG. 8 is a graph showing whether to skip a sampling operation according to an exemplary embodiment of the present invention.

First, for convenience of description, a process until an MPP voltage corresponding to an output voltage for extracting the maximum power is acquired and a sampling operation for the MPP voltage is performed may be considered a first process, and a process until the input power is acquired on the basis of an input voltage and an input current sensed by the sensing part 300 may be considered a second process.

The first process and the second process may be repeatedly performed. In this way, the energy harvesting system 10 can compare power corresponding to a specific MPP voltage with a specific input voltage and skip the first process at a certain time point in accordance with the comparison result, thereby increasing efficiency.

For reference, the AI calculator 200 may be trained to estimate next power on the basis of the second process which is repeatedly performed. In other words, the energy harvesting system 10 can sense an input voltage and an input current during a certain cycle through the sensing part 300, calculate power, and estimate power of the next cycle on the basis of the calculated power through the AI calculator 200.

Referring to FIG. 8, it may be assumed that the first process is performed at time points t and t+1 in accordance with first cycles and the second process is performed in accordance with second cycles which are shorter than the first cycles.

Here, the energy harvesting system 10 may set a specific MPP voltage corresponding to a comparison reference to an MPP voltage acquired as a result of performing the first process at the time point t. In other words, the MPP voltage acquired as the result of performing the first process at the time point t may be set as an initial MPP voltage and searched for (FIND MPP).

Also, the energy harvesting system 10 can repeatedly sense an input voltage and an input current through the sensing part 300 and acquire specific input power estimated at the time point t+1 through the AI calculator 200. Subsequently, the energy harvesting system 10 may compare power corresponding to the specific MPP voltage with the specific input power.

When a difference value which is the comparison result is within a preset range, the energy harvesting system 10 may skip the first process at the time point t+1. On the other hand, when the difference value which is the comparison result deviates from the preset range, the energy harvesting system 10 may replace an MPP voltage acquired as a result of performing the first process at the time point t+1 with the specific MPP voltage.

In other words, the energy harvesting system 10 compares input power with existing power (power corresponding to an initial or previous MPP voltage) through the AI calculator 200. When the power difference is likely to be within the preset range, the energy harvesting system 10 may skip an MPP voltage sampling operation. When the power difference is likely to deviate from the preset range, the energy harvesting system 10 may perform an MPP voltage sampling operation at a corresponding timing. Here, the preset range may vary depending on the case but may be set within 10% of the power corresponding to the specific MPP voltage.

Also, after the first process is performed or skipped at the time point t+1, the specific MPP voltage (a result of performing the first process at the time point t or a result of performing the first process at the time point t+1) corresponding to the comparison reference may be compared with input power estimated at a time point t+2, and the process may be repeatedly performed.

In this way, unlike an operation of sampling an MPPT voltage during a certain period of time according to the related art, it is possible to notice a situation in which the MPP is not tracked in real time in judgment by the AI calculator 200 and sample an MPPT voltage at a specific time. Also, when it is determined that the MPP is continuously tracked within a certain range in a current situation, a sampling process can be skipped. Accordingly, it is possible to reduce unnecessary sampling operations and increase efficiency.

According to the present invention, power calculation is performed through AI calculation on the basis of efficiency and information of input and output voltages and currents which are measured in advance, and sampling of an open circuit voltage is performed at an appropriate ratio not at regular intervals but at a specific time. Accordingly, it is possible to reduce unnecessary processes, improve the completion and accuracy of MPPT, and increase the efficiency.

According to the present invention, the following effects are provided.

According to the present invention, an energy harvesting system, to which a wider range of input power than a single output of single input power (e.g., a 2.5 V input voltage and a 4.2 V output voltage) input to an existing general system is input, flexibly tracks maximum power in accordance with power received from an energy harvesting source. Accordingly, it is possible to induce a maximum amount of power with higher efficiency than in the related art.

Also, according to the present invention, it is possible to efficiently produce renewable energy at a flexible ratio and use the produced energy by deviating from a single ratio, that is, 80% of an open circuit voltage, of an existing MPPT algorithm. Accordingly, the present technology is valuable for various systems.

Further, according to the present invention, the production efficiency of renewable energy is maximized in living in a model society of an age in which carbon neutrality is declared. Accordingly, consumers can use more electricity than before.

The above-described exemplary embodiments of the present invention may be implemented in the form of program commands that are executable through various computer components, and recorded on a computer-readable medium. The computer-readable medium may include program commands, data files, data structures, or the like solely or in combination. The program commands recorded on the computer-readable medium may be known and available to those skilled in the field of computer software. Examples of the computer-readable recording medium include a hardware device specially configured to store and execute program commands such as a hard disk, a read-only memory (ROM), a random access memory (RAM), a flash memory, etc. Examples of the program commands include not only machine language code generated by a compiler but also high-level language code that is executable by a computer using an interpreter or the like. The hardware device may be configured to operate as one or more software modules to perform operations according to the present invention, and vice versa.

Although the present invention has been described with specific details, such as specific components, limited embodiments and drawings, these are provided to facilitate general understanding of the present invention, and the present invention is not limited to the embodiments. Those skilled in the art can make various modifications and alterations from the description.

Therefore, the spirit of the present invention should not be limited to the above-described embodiments, and it is to be noted that the spirit of the present invention encompasses not only the following claims but also all modifications equivalent to the claims.

What is claimed is:

1. A method for extracting maximum power from an input source when an energy harvesting system for extracting the maximum power includes a converter, a sensing part, an artificial intelligence (AI) calculator, and a resistor part, the method comprising:

(a) sensing, by the energy harvesting system, an input voltage and an input current from the input source using the sensing part, converting the input voltage and the input current which correspond to analog values into digital values through an analog-to-digital converter (ADC) block, and transmitting the digital values to the AI calculator;

(b) calculating, by the energy harvesting system, input power on the basis of the digital values using the AI calculator and acquiring a first sampling ratio for extracting maximum power on the basis of the input power;

(c) controlling, by the energy harvesting system, a resistor divider ratio on the basis of the first sampling ratio to equalize a sampling ratio to the first sampling ratio; and (d) after a sampling operation based on the first sampling ratio is completed, performing, by the energy harvesting system, a regulation operation through the converter, wherein, when there is a data table in which an input voltage for a table and an output voltage for a table and efficiency in accordance with an input current for a table are recorded for each of a plurality of sampling ratios, the energy harvesting system acquires, using the AI calculator, the first sampling ratio among the plurality of sampling ratios included in the data table on the basis of i) the calculated input power and ii) an output voltage determined through an output voltage monitoring circuit, and wherein the energy harvesting system acquires the output voltage corresponding to an analog value every certain cycle using the output voltage monitoring circuit included in the converter, converts the output voltage into a digital value through the ADC block, and transfers the digital value to the AI calculator.

2. The method of claim 1, wherein the energy harvesting system acquires the input voltage and the input current corresponding to the analog values every certain cycle using the sensing part, converts the input voltage and the input current into the digital values through the ADC block, and transfers the digital values to the AI calculator.

3. The method of claim 1, wherein the energy harvesting system repeatedly performs the sampling operation of acquiring the first sampling ratio on the basis of the output voltage and the regulation operation based on a sampled voltage.

4. The method of claim 1, wherein the plurality of sampling ratios include 50%, 60%, 70%, 80%, and 90%.

5. The method of claim 1, wherein, when (i–1) a process until a maximum power point (MPP) voltage corresponding to an output voltage for extracting the maximum power is acquired and a sampling operation for the MPP voltage is performed is a first process and (i–2) a process until the input power is acquired on the basis of the input voltage and the input current sensed by the sensing part is a second process, while the first process and the second process are repeatedly performed, the energy harvesting system compares power corresponding to a specific MPP voltage with a specific input voltage and skips the first process at a certain time point in accordance with a comparison result to increase efficiency.

6. The method of claim 5, wherein, when the AI calculator is trained to estimate next power on the basis of the second process which is repeatedly performed, the first process is performed at time points t and t+1 in accordance with first cycles and the second process is performed in accordance with second cycles which are shorter than the first cycles, the energy harvesting system sets a specific MPP voltage corresponding to a comparison reference to an MPP voltage acquired as a result of performing the first process at the time point t, acquires the specific input power estimated at the time point t+1 through the AI calculator, and compares power corresponding to the specific MPP voltage with the specific input power, and the energy harvesting system 10 skips the first process at the time point t+1 (ii–1) when a difference value which is a comparison result is within a preset range, and replaces an MPP voltage acquired as a result of performing the first process at the time point t+1 with the specific MPP voltage (ii–2) when the difference value which is the comparison result deviates from the preset range.

7. The method of claim 6, wherein the preset range is within 10% of the power corresponding to the specific MPP voltage.

8. An energy harvesting system that is a system for extracting maximum power from an input source, the system comprising:

a sensing part configured to sense an input voltage and an input current from the input source, convert the input voltage and the input current which correspond to analog values into digital values through an analog-to-digital (ADC) block, and transmit the digital values to an artificial intelligence (AI) calculator;

the AI calculator configured to calculate input power on the basis of the digital values and acquire a first sampling ratio for extracting maximum power on the basis of the input power;

a converter configured to perform a regulation operation after a sampling operation based on the first sampling ratio is completed, and a resistor, wherein a resistor divider ratio is controlled on the basis of the first sampling ratio to equalize a sampling ratio to the first sampling ratio, wherein, when there is a data table in which an input voltage for a table and an output voltage for a table and efficiency in accordance with an input current for a table are recorded for each of a plurality of sampling ratios, the energy harvesting system acquires, using the AI calculator, the first sampling ratio among the plurality of sampling ratios included in the data table on the basis of i) the calculated input power and ii) an output voltage determined through an output voltage monitoring circuit, and wherein the energy harvesting system acquires the output voltage corresponding to an analog value every certain cycle using the output voltage monitoring circuit included in the converter, converts the output voltage into a digital value through the ADC block, and transfers the digital value to the AI calculator.

* * * * *